(12) United States Patent  
Amann

(10) Patent No.: US 7,141,101 B2  
(45) Date of Patent: Nov. 28, 2006

(54) FILTER ASSEMBLY WITH NOISE ATTENUATION

(75) Inventor: Harold P. Amann, Sunset Hills, MO (US)

(73) Assignee: Home Health Medical Equipment Incorporated, Fenton, MO (US)

( * ) Notice: Subject to any disclaimer, the term of this patent is extended or adjusted under 35 U.S.C. 154(b) by 239 days.

(21) Appl. No.: 10/710,087

(22) Filed: Jun. 17, 2004

(65) Prior Publication Data

US 2005/0279212 A1    Dec. 22, 2005

(51) Int. Cl.  
    *B01D 35/14*    (2006.01)
(52) U.S. Cl. .................. 96/380; 55/385.3; 55/413; 55/486; 55/497; 96/381; 96/382; 96/383; 96/384; 96/385; 96/386; 96/387; 96/388; 181/231; 181/256; 181/229; 181/252
(58) Field of Classification Search .............. 55/385.3, 55/413, 486, 497; 96/380–388, 413–417; 181/231, 256, 229, 252  
    See application file for complete search history.

(56) References Cited

U.S. PATENT DOCUMENTS

| | | | | |
|---|---|---|---|---|
| 3,688,476 A | * | 9/1972 | Lenane | .................. 96/380 |
| 4,072,210 A | * | 2/1978 | Chien | ..................... 184/5 |
| 5,059,221 A | * | 10/1991 | McWilliam | .......... 96/380 |
| 5,067,253 A | * | 11/1991 | Hauch et al. | ........... 34/82 |
| 5,250,179 A | | 10/1993 | Spearman | |
| 5,376,270 A | | 12/1994 | Spearman | |
| 5,376,272 A | | 12/1994 | Spearman | |
| D357,737 S | | 4/1995 | Spearman | |
| D373,637 S | | 9/1996 | Spearman | |
| 5,599,448 A | | 2/1997 | Spearman | |
| D410,727 S | | 6/1999 | Khamis et al. | |
| 5,916,435 A | | 6/1999 | Spearman et al. | |
| 5,996,731 A | * | 12/1999 | Czabala et al. | ............. 181/229 |
| 6,010,458 A | | 1/2000 | Roberts | |
| 6,110,260 A | * | 8/2000 | Kubokawa | ..................... 96/26 |
| 6,126,721 A | * | 10/2000 | Nemser et al. | ................ 95/54 |
| 6,136,077 A | * | 10/2000 | Walker | ........................ 96/380 |
| 6,381,983 B1 | | 5/2002 | Angelo | |
| 6,517,614 B1 | * | 2/2003 | Klotz et al. | .................... 96/384 |
| 6,551,289 B1 | * | 4/2003 | Higuchi et al. | ............. 604/272 |
| 6,702,880 B1 | * | 3/2004 | Roberts et al. | ............... 96/381 |
| 2002/0174774 A1 | * | 11/2002 | Chen | ........................... 96/416 |
| 2003/0213368 A1 | | 11/2003 | Roberts et al. | |
| 2004/0065195 A1 | * | 4/2004 | Gogins | ........................... 95/8 |
| 2004/0261621 A1 | * | 12/2004 | Lindsay | ....................... 96/388 |

* cited by examiner

*Primary Examiner*—Duane Smith  
*Assistant Examiner*—Minh-Chau T. Pham  
(74) *Attorney, Agent, or Firm*—Blackwell Sanders Peper Martin LLP; Samuel Digirolamo

(57) ABSTRACT

A filter assembly configured for acoustic dampening for use with compressor assemblies such as oxygen concentrators including a compartmented housing member having an inlet opening, an outlet opening, a filter member, and a plurality of noise attenuating members positioned and located therewithin. The configuration of the compartmented housing member in conjunction with the positioning and location of the filter member and the noise attenuating members therewithin all contribute to absorb and dissipate any sound waves generated within the housing member due to air flow movement therethrough. This substantially reduces and minimizes noise associated with the present filter assembly.

41 Claims, 3 Drawing Sheets

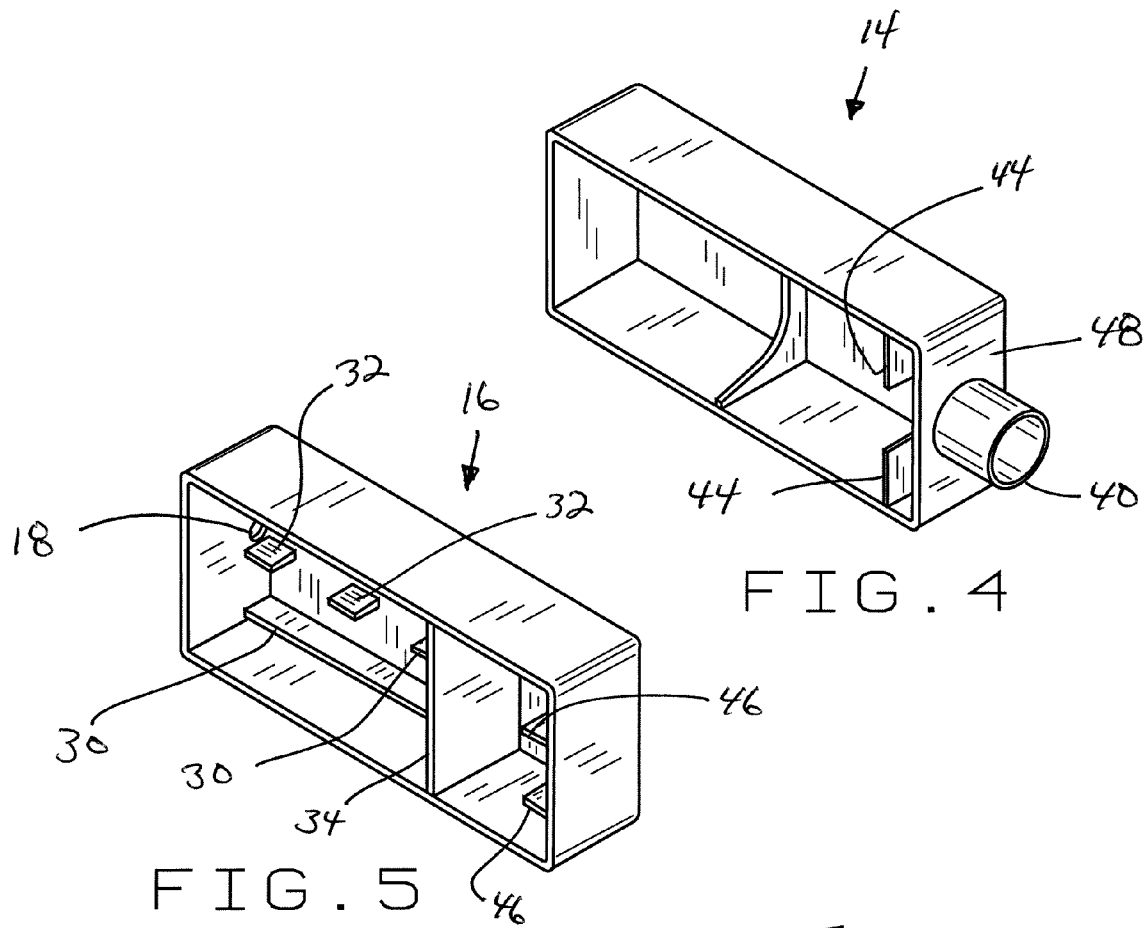
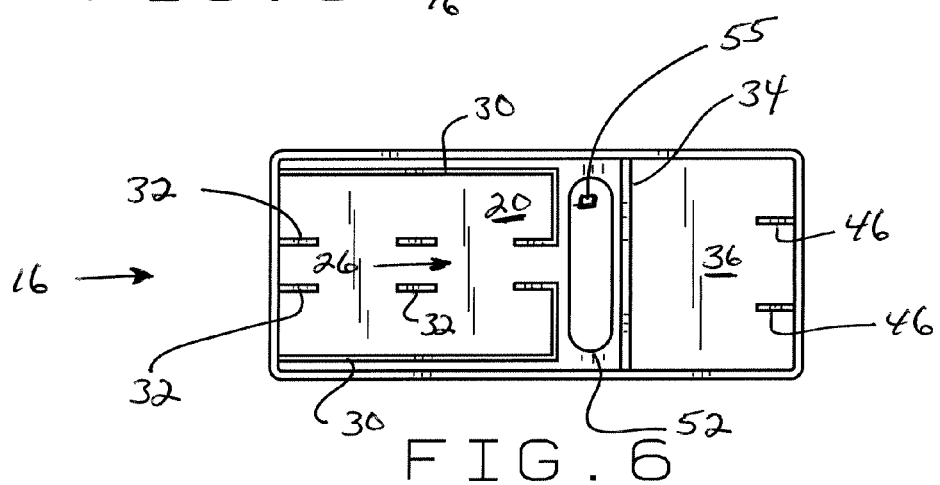

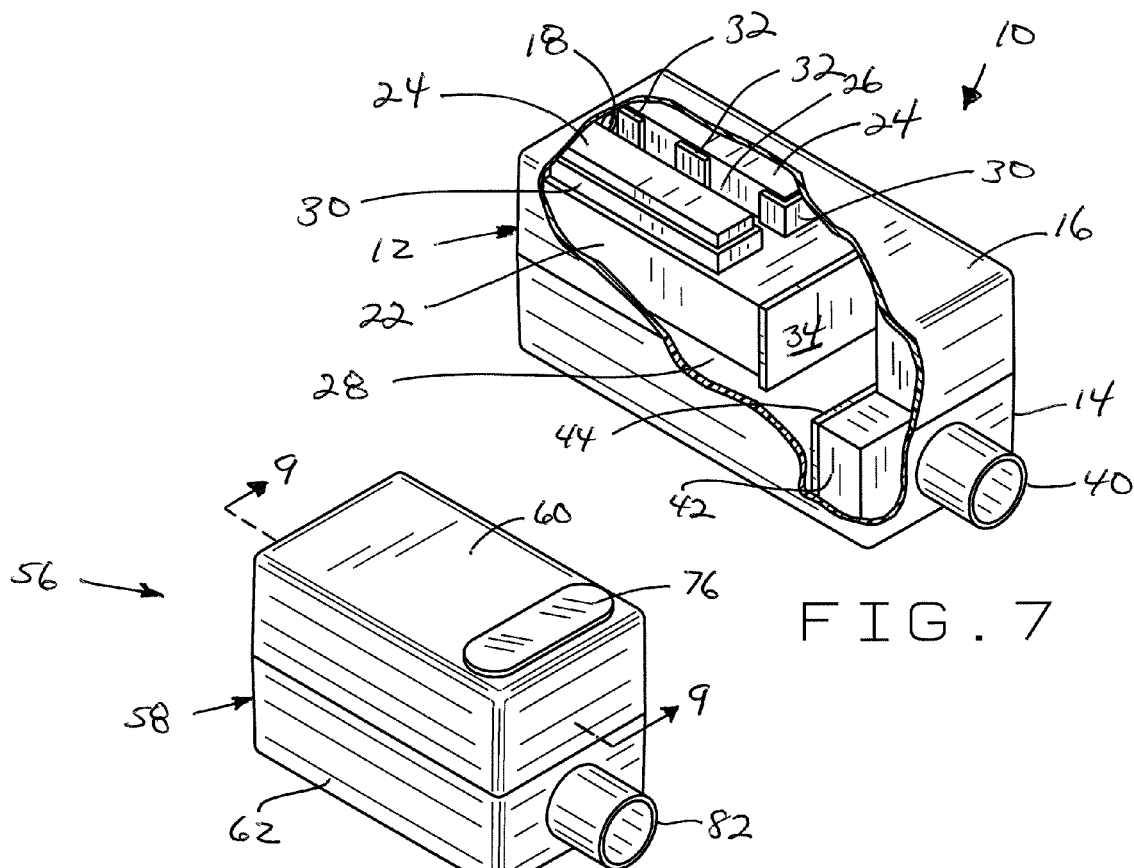
FIG. 7
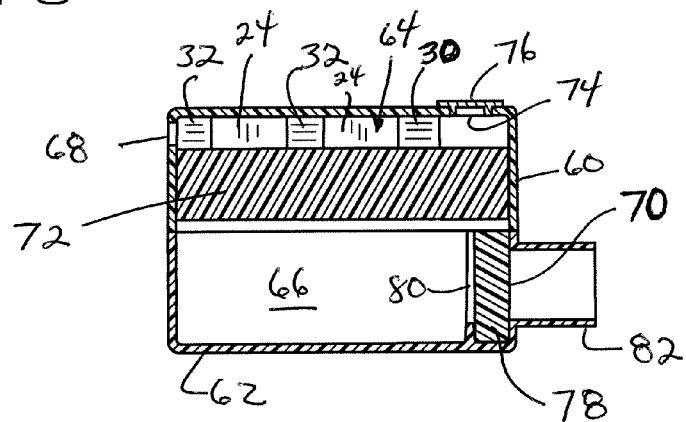
FIG. 8
FIG. 9

FILTER ASSEMBLY WITH NOISE ATTENUATION

BACKGROUND OF INVENTION

This invention relates generally to filter assemblies and, more particularly, to various embodiments of a filter assembly configured for acoustic damping for use in compressors such as oxygen concentrators and other medical applications in the home care medical equipment industry.

Oxygen concentrators are commonly used in the care of respiratory patients, particularly, in the home care environment, to provide sufficiently high purities of oxygen to the patient without using high pressure tanks or liquid oxygen. Oxygen concentrators utilize ambient atmospheric air as their source of oxygen in conjunction with an absorption system such as one or more molecular sieve beds to separate oxygen from the other gases found in the air and to provide that oxygen in concentrated form to the patient. Atmospheric air typically includes approximately 80% nitrogen and 20% oxygen. Nitrogen is absorbed by the absorption system and is retained therein until subsequently purged.

Typically, atmospheric air is drawn into an oxygen concentrator from the ambient environment. Such ambient air is then passed through a filter assembly to remove dust and other contaminants, and the filtered air is then pressurized by a compressor for introduction into the absorption system. Once the compressed air is introduced into the absorption system, the nitrogen is selectively absorbed and released to atmosphere leaving the residual oxygen available for patient use. The absorption system is then regenerated and made ready for the next cycle. Oxygen concentrators typically produce an oxygen concentration usually in the range of 90–95%.

Use of an effective filtration system for purging contaminants from any liquid or gas is always important for a multitude of obvious reasons. Properly and effectively filtering the incoming ambient air before it is compressed and introduced into the absorption system of an oxygen concentrator is likewise important because effective filtration not only improves the overall efficiency of the oxygen concentrator but it also improves and increases the oxygen concentration provided to the patient. Poor filtration of the incoming air also subjects the oxygen concentrator and its associated compressor to excessive wear from particles which contaminate the system thereby decreasing service life while increasing maintenance.

Routine maintenance also includes changing the filter assembly at some point in time when the filter is dirty and no longer functional within certain parameters. It is often difficult to determine when the filter assembly should be changed because the filter element is often times hidden and concealed within an opaque housing structure. As a result, such filters are often replaced at a predetermined regular time interval regardless of the actual condition of the filter element. This is not economical or efficient since, depending upon the type and amount of use of the oxygen concentrator, the filter element may still be operable and may still have additional useful life when it is replaced at the predetermined time interval. A better mechanism for identifying when the filter element should be changed is needed.

Still further, the type and size of compressor associated with an oxygen concentrator determines the overall oxygen flow rate capacity as well as the level of noise produced by the system during operation. In general, large compressors required for providing higher rates of oxygen can be quite noisy. Also, such oxygen concentrators are typically used at home, or in a hospital or nursing home type environment, where noise generation can be a problem. Despite the fact that efforts are made to insulate and dampen the noise for the compressor, the sound generated is often excessive. Noise attenuation is therefore always an issue.

It is therefore desirable to provide a filter assembly which improves the air filtration process to the absorption system of an oxygen concentrator or other compressor assembly, which includes means for determining when to change the filter assembly, and which includes means to reduce and dampen the overall noise level associated with the operation of an oxygen concentrator or other compressor assembly.

Accordingly, the present invention is directed to a filter assembly which overcomes one or more of the problems as set forth above.

SUMMARY OF INVENTION

The present invention overcomes many of the shortcomings and limitations of the prior art devices discussed above and teaches the construction and operation of several embodiments of a filter assembly adaptable for use in a wide variety of different compressor assemblies wherein air is filtered or otherwise purged of contaminants such as for use in oxygen concentrators and other medical applications in the home care medical equipment area. In one aspect of the present invention, the filter assembly includes a compartmented housing structure having an inlet and an outlet. The inlet is positioned in the housing member for allowing ambient air to enter the filter assembly for passage therethrough before becoming compressed for use in an oxygen concentrator or other compressor application. The inlet is positioned in communication with a first region or first chamber in the housing member which includes a conventional filter member such as a solid core type filter, a pleated type filter, a HEPA filter, or other filter element, and a pair of noise attenuating foam members positioned in spaced apart relationship on top of the conventional filter so as to form a channel therebetween. The inlet is positioned in communication with the channel formed between the pair of noise attenuating members such that ambient air entering the housing member through the inlet will migrate along the channel, through the noise attenuating members and conventional filter into a second region or second chamber associated with the housing member. The noise attenuating members serve to suppress the noise of the air flow as it enters and circulates through the first chamber by absorbing much of the sound generated therein.

The second chamber is located below the first chamber and lies in communication with a third region or third chamber which includes the outlet. Another noise attenuating member is positioned in front of the outlet to further suppress the noise associated with the air flow as it passes through the second and third chambers and into the outlet. The third chamber is positioned adjacent to and in communication with the second chamber thereby providing additional volume so as to allow the air flow exiting the second chamber and entering the third chamber to expand thereby reducing the pressure in the third chamber and dispersing the sound associated with the air flow movement therethrough. This reduction in pressure in the third chamber coupled with the small pressure differential overall between the inlet and outlet enhances noise attenuation as the air flow exits the outlet of the housing structure. The noise attenuating members serve both as a filtering medium as well as a noise attenuation means for reducing the overall noise level of the air entering the compressor portion an oxygen concentrator or other compressor assembly. The first and third chambers also include appropriate structure for holding the noise attenuating members in proper relationship to the conventional filter and outlet associated with the housing member.

The present housing member may also optionally include a window or sight glass located above a portion of the conventional filter located in the first chamber for viewing the cleanliness and operability of such filter. This window enables a viewer to assess the cleanliness of the conventional filter and to determine if such filter needs replacement. If the conventional filter is dirty and contaminated, the entire filter assembly is removed and replaced.

In another aspect of the present invention, the housing member includes first and second chambers, the first chamber including the inlet and the second chamber including the outlet. The first chamber likewise includes a conventional filter member and a pair of noise attenuating members positioned therewithin as previously described.

Ambient air enters the filter assembly through a similarly positioned inlet and travels through the first chamber in a substantially similar manner as previously described. Air exiting the first chamber enters the second chamber which includes the outlet and another noise attenuating member positioned over the outlet. Once the air has traveled into the second chamber, it then flows through the second chamber and through the noise attenuating member positioned over the mouth of the outlet thereby allowing the filtered air to exit the filter assembly for passage into the compressor assembly of an oxygen concentrator or other compressor assembly.

BRIEF DESCRIPTION OF DRAWINGS

FIG. 4 is a perspective view of the lower housing portion of the filter assembly of FIG. 1.

FIG. 5 is a perspective view of the upper housing portion of the filter assembly of FIG. 1.

FIG. 6 is a side elevational view of the upper housing portion of FIG. 5 looking into the interior of the housing member.

FIG. 7 is a cut-away perspective view of the filter assembly of FIGS. 1–6.

FIG. 8 is a perspective view of another embodiment of the present filter assembly constructed in accordance with the teachings of the present invention.

FIG. 9 is a cross-sectional view of the filter assembly of FIG. 8 taken along line 9—9 of FIG. 8.

DETAILED DESCRIPTION

Figure 1:
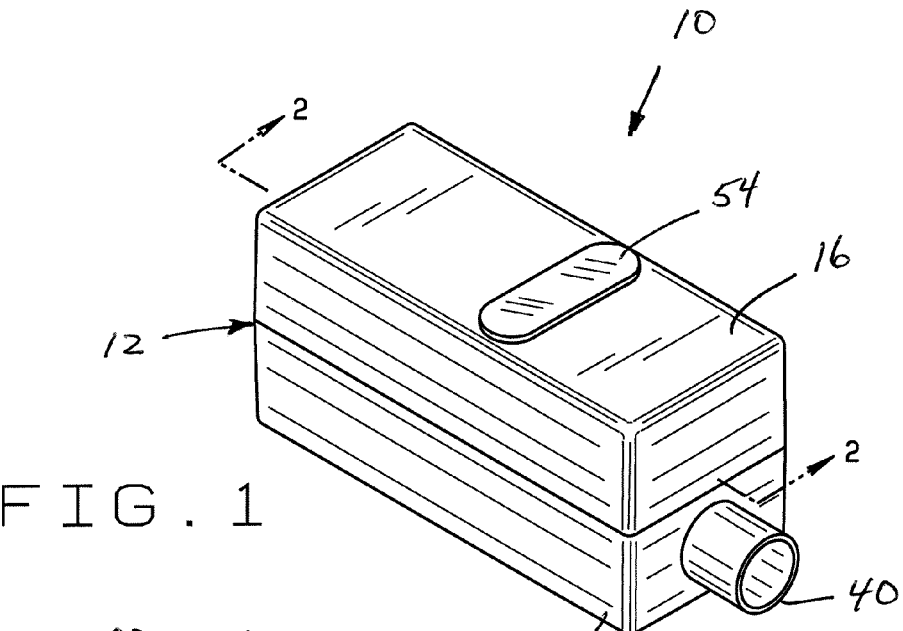
FIG. 1 is a perspective view of one embodiment of the present filter assembly constructed in accordance with the teachings of the present invention.

Referring to the drawings more particularly by reference numbers wherein like numerals refer to like parts, the numeral 10 in FIGS. 1–3 and 7 identifies one embodiment of a filter assembly constructed according to the teachings of the present invention. The filter assembly 10 can be constructed so as to be compatible for attachment to any suitable type of compressor fitting associated with any compressor assembly where the present filter assembly may be utilized. Although the specific compressor application discussed herein is directed to an oxygen concentrator used in the medical equipment industry, it is recogized and anticipated that the present filter assembly can be utilized with any compressor assembly where ambient air or any other air source needs to be filtered during the compression process or other application. It is also recognized that the filter assembly constructed according to the teachings of the present invention can likewise be fashioned into a variety of different sizes and shapes other than those illustrated herein and that the other components associated with the present assemblies may likewise be correspondingly shaped to conform to the shape of the overall assembly without departing from the teachings and practice of the present invention.

The filter assembly illustrated in FIGS. 1–7 includes a generally hollow rectangularly shaped housing member 12 which, for ease of manufacture, includes two separate housing portions, namely, a lower housing portion 14 illustrated in FIG. 4 and an upper housing portion 16 illustrated in FIG. 5. Housing portions 14 and 16 are bonded or otherwise securely attached to each other to form an airtight seal using any suitable means. It has been found that an ultrasonic weld joint accomplishes this task, although other attachment or bonding means can likewise be utilized so long as an airtight seal is formed.

Figure 2:
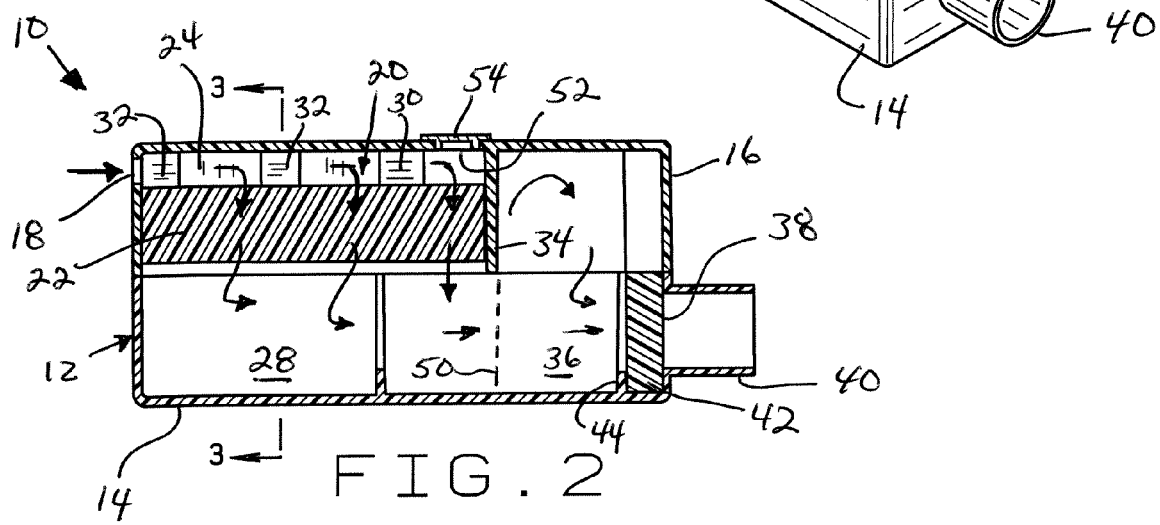
FIG. 2 is a cross-sectional view of the filter assembly of FIG. 1 taken along line 2—2 of FIG. 1.
Figure 3:
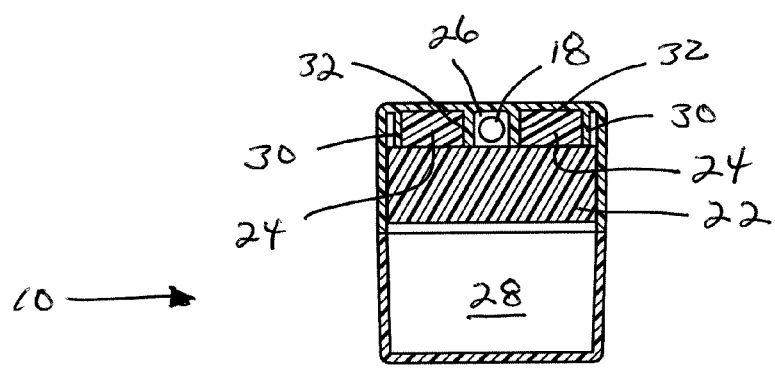
FIG. 3 is a cross sectional view of the filter assembly of FIG. 1 taken along line 3—3 of FIG. 2.

As best shown in FIGS. 2, 3 and 5, the upper housing portion 16 includes an inlet opening 18, preferably in the form of a circular opening, for allowing ambient air to enter the filter assembly for passage therethrough. The inlet opening 18 is positioned and located in communication with a first region or first chamber 20 which includes a conventional filter member 22 and a pair of noise attenuating members 24 which are positioned in spaced apart relationship on top of filter member 22 so as to form a channel 26 therebetween. The filter member 22 can be a solid core type filter, a pleated type filter, a HEPA filter, or other appropriate filter depending upon the particular application involved. The noise attenuating members 24 are preferably foam type members, although any noise attenuating means such as felt pads and the like may be utilized. The inlet opening 18 is positioned in communication with the channel 26 formed between the noise attenuating members 24 such that ambient air entering the housing member 12 will migrate along the channel 26 through the noise attenuating members 24 and/or filter member 22 into a second region or second chamber 28 located adjacent to and on the opposite side of filter member 22.

As best shown in FIGS. 2, 5, 6 and 7, the noise attenuating members 24 are positioned and held in place within the upper housing portion 16 via a pair of J-shaped retaining members 30 and a plurality of projection members or tabs 32 which can be integrally formed with housing portion 16 or can be otherwise fixedly attached to the upper wall portion of housing portion 16. The retaining members 30 and 32 are positioned and located as illustrated in FIG. 6 such that the noise attenuating members 24 can be positioned and held therebetween as best shown in FIGS. 3 and 7. In this regard, the noise attenuating members 24 are sized and dimensioned so as to securely fit within the space defined by the retaining members 30 and 32 as illustrated in FIG. 6. The noise attenuating members 24 serve to suppress the noise of the air flow as it enters and circulates through the first chamber 20 by absorbing much of the sound generated therein. A partition member 34 is positioned and located intermediate the upper housing portion 16 and functions to separate the first chamber 20 from the third chamber 36. Partition member 34 in conjunction with the restraining members 30 and 32 likewise function to support and hold the conventional filter member 22 in proper position within chamber 20. Although only a pair of members 24 are illustrated in FIGS. 3 and 7, it is recognized that any number of noise attenuating members 24 may be strategically positioned within chamber 20 and any number of retaining members or other appropriate structure may be used to hold the plurality of members 24 in position within chamber 20.

The second chamber 28 lies adjacent to chamber 20 on the opposite side of filter member 22 and receives the filtered air as it exits chamber 20. The second chamber 28 is substantially open and lies in communication with a third region or third chamber 36 which includes an outlet opening 38 which provides an exit passageway for allowing the air which has circulated through the filter assembly 10 to exit the assembly for passage into the compressor assembly. Outlet opening 38 communicates with a tubular extension 40 as illustrated in FIGS. 1, 2, 4 and 7 which likewise includes an opening extending therethrough which communicates with the outlet opening 38. The tubular extension 40 is adaptable for engaging a corresponding compressor fitting to which the present filter assembly 10 would be attached. It is recognized and anticipated that the tubular extension 40 could be modified to adapt for connection to any suitable type of compressor fitting depending upon the particular application involved. This means that the tubular portion 40 could be either internally or externally threaded based upon the particular compressor fitting, or a rubber hose or other fitting member could be slidably engaged over the exterior portion of tubular extension 40.

Another noise attenuating member 42 is positioned and located in front of outlet opening 38 to further suppress the noise associated with the air flow as it passes through the second and third chambers 28 and 36 respectively and exits the housing member 12. A pair of spaced tabs or projecting support members 44 as best shown in FIG. 4 are positioned and located within the lower housing portion 14 so as to sufficiently hold the noise attenuating member 42 in proper position in front of outlet opening 38. The support members 44 can likewise be integrally formed with lower housing portion 14 or otherwise fixedly attached; they could be separate members; or the members 44 could be part of a single wall member having an opening or slot associated therewith positioned in front of or across the mouth of the outlet opening 38. In similar fashion, the upper housing portion 16 includes a pair of spaced apart members 46 which, when housing portion 16 is positioned on top of housing portion 14 and secured thereto, rest against and abut the noise attenuating member 42 thereby providing additional structure and support for holding the noise attenuating member 42 in its proper position. In a preferred embodiment, noise attenuating member 42 will extend along the entire end wall portion 48 of the lower housing portion 14 to provide maximum suppression of any sound generated within the second and third chambers 28 and 36 due to the air flow movement therethrough. Any plurality of holding members 44 and 46 may be utilized with housing portions 14 and 16 to securely hold the noise attenuating member 42 in proper position in front of outlet opening 38 and across the inner wall surface 48 of housing portion 14.

As best shown in FIG. 2, the third chamber 36 is positioned adjacent to and in communication with the second chamber 28. The imaginary line 50 in FIG. 2 represents an imaginary separation of the second and third chambers. In reality, chambers 28 and 30 can be considered as one chamber within the housing member 12. The third chamber 36 provides additional volume adjacent the second chamber 28 so as to allow the air flow exiting the second chamber and entering the third chamber to expand thereby reducing the overall air pressure in the third chamber as the air flow makes its way to the outlet opening 38. This expansion of the air flow within chamber 36 allows any sound waves generated within the second and third chambers 28 and 36 due to air flow movement therethrough to further disburse and dissipate thereby further reducing any noise associated with air flow entering the compressor assembly. The reduction in pressure in third chamber 36 coupled with the overall small pressure differential existing between the inlet opening 18 and the outlet opening 38 further enhances noise attenuation as the air flow exits the housing member 12. As a result, the combination of both air expansion within chamber 36 and the use and strategic positioning of the various noise attenuating members 24 and 42 within the housing member 12 all contribute to substantially reducing and dampening the noise levels associated with ambient air moving through the filter assembly 10 and into the compressor assembly associated with any type of compressor unit such as an oxygen concentrator. Although the noise attenuating members 24 and 42 function primarily to absorb and reduce the overall noise level of the air flow moving through the filter assembly 10, such members also serve as an additional filtering medium as air flow will likewise move through these members as the ambient air traverses its way through chambers 20, 28 and 36.

The noise attenuating members 24 and 42 serve primarily as sound/acoustic dampening material to minimize the noise emissions from the oxygen concentrator or other compressor assembly. Sound waves tend to reflect and reverberate off of hard surfaces such as any exposed internal surfaces associated with housing portions 14 and 16 as illustrated in FIGS. 4 and 5. If these hard surfaces are covered or otherwise shielded with noise attenuating members such as the members 24 and 42 associated with the present filter assembly 10, such noise attenuating members tend to absorb the sound and minimize any reflections and reverberations of sound waves within the housing member 12. In the filter assembly 10 illustrated in FIGS. 1–7, almost all of the hard surfaces associated with the first chamber 20 are shielded by either the noise attenuating members 24 or the filter member 22. The only exposed hard surfaces associated with chamber 20 lie in the path of air channel 26 and include a small portion of the upper housing portion 16 which overlays channel 26 as well as a portion of partition member 34 which extends above filter member 22. All other surfaces associated with chamber 20 are covered by either the filter member 22 or the noise attenuating members 24. As a result, any sound reflecting off of any reflective surface associated with chamber 20 will tend to reflect towards a surface which is covered by either the filter member 22 or the noise attenuating members 24 and any such sound will be dampened and/or absorbed. As a result, acoustic dampening occurs within chamber 20.

In similar fashion, the entire upper portion of the second chamber 28 is formed by the filter member 22 and the entire end wall portion 48 of the lower housing portion 14 is likewise covered with noise attenuating member 42 as illustrated in FIG. 2. These additional sound absorbing members further dampen and absorb any sound wave reflections and/or reverberations which may occur in chambers 28 and 36. This construction in conjunction with the reduction in pressure associated with chamber 36 due to additional volume being provided adjacent chamber 28 substantially reduces the noise associated with use of the present filter assembly 10.

Although it is generally preferred that foam type members be used as the noise attenuating members 24 and 42, it is also recognized and anticipated that other noise attenuating materials with appropriate sound absorptive properties are also available and suitable for use in association with the present filter assembly 10. Such materials would have to provide the necessary flow characteristics and noise reduction suitable for the intended use of the particular filter assembly. Whether foam pads, felt pads or other materials are used to form the noise attenuating members 24 and 42, it is also recognized and anticipated that such members may be of either a unitary or multi-piece construction.

The housing member 12 and, particularly, the upper housing portion 16 may optionally include an opening 52 located between the retaining members 30 and the partition member 34 as best shown in FIG. 6 for cooperatively receiving a sight glass or window member 54. The opening 52 and associated sight glass 54 are located above a portion of the filter member 22 which is not over laid by a noise attenuating member 24 thereby providing clear access for viewing the cleanliness and operability of the filter member 22. The sight glass 54 enables a viewer to assess the cleanliness of the filter member 22 and to determine if such filter needs replacement. This determination can be made visually by checking the cleanliness or dirtiness of the filter itself. Based upon passed experience, parameters can be established for determining when the filter assembly should be replaced. This is typically based upon the color or shade of gray or black associated with the filter since most filters used in these applications are white in color. In this regard, a color scale, comparison color shade or other indicator 55 can be associated with the sight glass 54 such that when the color of the filter member 22 matches the color scale or color shade associated with the sight glass 54, the filter assembly can be replaced. This facilitates proper replacement of the filter assembly and avoids the possibility that the filter element may still be operable and may still have additional useful life when it is otherwise replaced based upon a predetermined time interval. If it is determined by viewing the filter element 22 through sight glass 54 that the filter element 22 is dirty and contaminated, the entire filter assembly 10 is removed and replaced.

FIGS. 8 and 9 disclose another embodiment 56 of the present filter assembly, the housing member 58 being substantially similar in construction and operation to housing member 12 but differing therefrom in that the third chamber 36 associated with the filter assembly 10 has been eliminated from filter assembly 56. Like housing member 12, the housing member 58 includes an upper housing member 60 and a lower housing member 62 which, when sealed in an airtight fashion as previously explained, form first and second chambers 64 and 66 respectively. The first chamber 64 includes inlet opening 68 and the second chamber 66 includes the outlet opening 70. The first chamber 64 is constructed substantially similar to the construction of chamber 20 associated with filter assembly 10 and includes a conventional filter member 72 and a pair of noise attenuating members positioned in spaced apart relationship on top of filter member 72 as previously described with respect to filter assembly 10 and as shown in FIGS. 3 and 7. The retaining members for positioning and locating the noise attenuating members within the upper housing portion 60 are substantially similar in construction and operation to the retaining members 30 and 32 illustrated in FIGS. 2, 3 and 5–7. Likewise, the opening 74 and sight glass 76 associated with the first chamber 64 are substantially similar in construction and operation to the opening 52 and sight glass 54 associated with filter assembly 10. As previously described, ambient air enters the filter assembly 56 through a similarly positioned inlet opening 68 and travels along the channel formed between the spaced noise attenuating members such as the channel 26 illustrated in FIG. 7 and through the first chamber in a substantially similar manner as previously described with chamber 20.

Air exiting the first chamber 64 enters the second chamber 66 and traverses its way through noise attenuating member 78 positioned in front of and across the mouth of the outlet opening 70 for passage into the compressor assembly. The noise attenuating member 78 is held in proper position in front of outlet opening 70 by support means 80 which is substantially similar in construction to the members 44 illustrated in FIG. 4. A tubular extension member 82, similar to extension member 40, communicates with the outlet opening 70 for allowing the air which is circulated through filter assembly 56 to exit the filter assembly for passage into the compressor assembly. The tubular extension member 82 is likewise adaptable for connection to any suitable type of compressor fitting depending upon the particular application involved. Although filter assembly 56 does not include a third chamber for allowing the air exiting the second chamber to expand and further dissipate prior to exiting through the outlet opening, the construction and operation of filter assembly 56 likewise substantially reduces noise associated with the compressor assembly due to the positioning and location of the noise attenuating members as previously described with respect to filter assembly 10. Sound wave reflections and reverberations are therefore absorbed and dampened by the positioning and location of the noise attenuating members associated with the filter assembly 56. Except for the elimination of the third chamber 36, the operation of filter assembly 56 is substantially similar to the operation of filter assembly 10 with respect to noise attenuation and acoustic dampening.

In certain compressor applications, particularly, where large compressors are being utilized to achieve higher rates of flow, controlling the diameter of the inlet openings 18 and 68 can likewise reduce inlet compressor noise as well as any noise associated with air flowing through the overall filter assembly. For example, in one particular application, a ¼ inch diameter inlet opening 18 in the upper housing portion 16 acted as a restrictor to air flow which further reduced the amount of audible noise generated by the compressor pump. As a result, for this particular application, an inlet opening size in the range of about ¼ inch diameter plus or minus $\frac{1}{32}$ inch was found to be sufficient for further noise reduction. Still further, it was also determined that rounding the entry edges of the inlet opening further facilitated noise attenuation.

It is also anticipated that the filter housing portions 14, 16, 60 and 62 can be made using an injection molded plastic resin, although other materials may likewise be utilized. Still further, it is also recognized that the overall dimensions of the present filter assemblies as well as the specific shape and configuration of the various members associated therewith are also subject to wide variations and may be sized and shaped into a wide variety of different sizes and configurations so as to be compatible with the size and shape of the particular compressor assembly into which the present structures may be mounted, or to conform with any space limitations associated therewith without impairing the teachings and practice of the present invention. Although the filter assemblies 10 and 56 are illustrated as being substantially rectangular, such members can likewise take on other shapes such as square, triangular and so forth. Other variations and modifications to the various components comprising the present structures are also contemplated.

Thus, there has been shown and described several embodiments of a novel filter assembly which is adaptable for installation onto the inlet of any compressor assembly, which filter assemblies fulfill all the objects and advantages sought therefor. Many changes, modifications, variations and other uses and applications of the present invention will, however, become apparent to those skilled in the art after considering this specification and the accompanying drawings. All such drawings, modifications, variations and other uses and applications which do not depart from the spirit and scope of the present invention are deemed to be covered by the present invention which is limited by the claims which follow.

The invention claimed is:

1. A filter assembly for use with a compressor assembly comprising:
    a housing member having an inlet opening and an outlet opening;
    a first chamber positioned and located within said housing member in communication with said inlet opening for receiving ambient air therewithin;
    a filter member disposed within the interior of said first chamber;
    at least a pair of noise attenuating members positioned within said first chamber in spaced apart relationship adjacent at least a portion of one side of said filter member forming a channel therebetween, said channel being in communication with said inlet opening;
    a second chamber positioned and located within said housing member adjacent another side of said filter member such that ambient air passing through said filter member will enter said second chamber;
    a third chamber positioned and located within said housing member in communication with said second chamber such that ambient air passing through said second chamber will enter said third chamber, said third chamber including said outlet opening; and
    another noise attenuating member positioned and located across said outlet opening;
    said noise attenuating members functioning as sound dampening means to absorb and minimize sound generated within the housing member due to air flow passing therethrough.

2. The filter assembly defined in claim 1 wherein said noise attenuating members are made of a foam material.

3. The filter assembly defined in claim 1 wherein said noise attenuating members are made of a felt material.

4. The filter assembly defined in claim 1 wherein said third chamber provides additional volume adjacent said second chamber for at least some of the ambient air to travel therethrough before exiting the housing member through said outlet opening.

5. The filter assembly defined in claim 4 wherein said additional volume allows the air flow exiting said second chamber to expand into said third chamber thereby reducing the overall air pressure in said third chamber as the air flow makes its way to said outlet opening.

6. The filter assembly defined in claim 1 wherein said housing member includes retaining members for holding said at least pair of noise attenuating members in said first chamber.

7. The filter assembly defined in claim 1 wherein said housing member includes at least one support member for holding the noise attenuating member positioned and located across said outlet opening in said third chamber.

8. The filter assembly defined in claim 1 wherein said housing member includes a lower housing portion and an upper housing portion.

9. The filter assembly defined in claim 1 wherein the entry edge portion of said inlet opening is rounded.

10. The filter assembly defined in claim 1 wherein said housing member further includes a window positioned and located above a portion of said filter member which is not overlaid by said noise attenuating members thereby providing clear access for viewing the cleanliness of said filter member.

11. The filter assembly defined in claim 10 including a color indicator positioned adjacent said window for viewing along with said filter member for comparison therewith such that when the color of the filter member matches the color indicator, said filter member can be replaced.

12. The filter assembly defined in claim 1 wherein said filter member is a HEPA filter.

13. A filter assembly for use with an oxygen concentrator comprising:
    a housing member having an inlet opening and an outlet opening;
    a first chamber positioned and located within said housing member in fluid communication with said inlet opening for receiving ambient air therewithin;
    a filter member disposed within the interior of said first chamber;
    a pair of noise attenuating members positioned within said first chamber in spaced apart relationship adjacent at least a portion of one side of said filter member to minimize noise from the ambient air flowing through said first chamber, said pair of noise attenuating members forming a channel therebetween, said channel being in fluid communication with said inlet opening;
    a second chamber positioned and located within said housing member adjacent another side of said filter member such that ambient air passing through said filter member will enter said second chamber;
    a third chamber positioned and located within said housing member in fluid communication with said second chamber, said third chamber including said outlet opening and providing additional volume for at least some of the ambient air to travel therethrough before exiting said housing member through said outlet opening; and
    another noise attenuating member positioned and located in front of said outlet opening to minimize noise from the ambient air exiting said housing member;
    said first, second and third chambers, said filter member and said noise attenuating members being disposed within said housing member such that ambient air entering said inlet opening will migrate along said channel and through said pair of noise attenuating members and/or said filter member into said second chamber, through said second chamber into said third chamber, and through said third chamber and said another noise attenuating member into said outlet opening;
    the configuration of said first, second and third chambers, along with the positioning and location of said filter member and said noise attenuating members therewithin providing noise attenuation for ambient air flowing through the filter assembly.

14. The filter assembly defined in claim 13 wherein said noise attenuating members are made of a foam type material.

15. The filter assembly defined in claim 13 wherein said housing member includes retaining means positioned within said first chamber for holding said pair of noise attenuating members in spaced apart relationship adjacent one side of said filter member.

16. The filter assembly defined in claim 13 wherein said housing member includes support means in said third chamber for holding said another noise attenuating member in front of said outlet opening.

17. The filter assembly defined in claim 13 wherein said another noise attenuating member positioned and located in front of said outlet opening extends along the entire length of the wall portion associated with said outlet opening in said third chamber.

18. The filter assembly defined in claim 13 wherein said housing member includes a tubular extension in communication with said outlet opening adaptable for engaging a corresponding compressor fitting associated with an oxygen concentrator.

19. The filter assembly defined in claim 13 wherein the entry edges of said inlet opening are rounded to further facilitate noise attenuation.

20. The filter assembly defined in claim 13 wherein the additional volume provided by said third chamber allows the air flow exiting said second chamber to expand into said third chamber thereby allowing any sound waves generated within second and third chambers to further disburse and dissipate as the air flow makes its way to said outlet opening.

21. The filter assembly defined in claim 16 wherein said housing member further includes at least one additional member associated with said third chamber for abutting said another noise attenuating member when said another noise attenuating member is held in proper position in front of said outlet opening by said support means.

22. The filter assembly defined in claim 13 wherein said housing member includes a sight glass positioned above a portion of said filter member at the opposite end of said first chamber from said inlet opening for viewing the cleanliness of said filter member.

23. A filter assembly for use with a compressor assembly comprising:
    a housing member having an inlet opening and an outlet opening;
    a first chamber positioned and located within said housing member in communication with said inlet opening for receiving ambient air therewithin;
    a filter member disposed within the interior of said first chamber;
    at least a pair of noise attenuating members positioned within said first chamber in spaced apart relationship adjacent at least a portion of one side of said filter member forming a channel therebetween, said channel being in communication with said inlet opening;
    a second chamber positioned and located within said housing member adjacent another side of said filter member such that ambient air passing through said filter member will enter said second chamber, said second chamber including said outlet opening; and
    another noise attenuating member positioned and located across said outlet opening;
    said noise attenuating members functioning as sound dampening means to absorb and minimize sound generated within the housing member due to air flow passing therethrough.

24. The filter assembly defined in claim 23 wherein said noise attenuating members are made of a foam material.

25. The filter assembly defined in claim 23 wherein said noise attenuating members are made of a felt material.

26. The filter assembly defined in claim 23 wherein said housing member includes retaining members for holding said at least pair of noise attenuating members in said first chamber.

27. The filter assembly defined in claim 23 wherein said housing member includes at least one support member for holding the noise attenuating member positioned and located across said outlet opening in said second chamber.

28. The filter assembly defined in claim 23 wherein said housing member includes a lower housing portion and an upper housing portion.

29. The filter assembly defined in claim 23 wherein the entry edge portion of said inlet opening is rounded.

30. The filter assembly defined in claim 23 wherein said housing member further includes a window positioned and located above a portion of said filter member which is not overlaid by said noise attenuating members thereby providing clear access for viewing the cleanliness of said filter member.

31. The filter assembly defined in claim 30 including a color indicator positioned adjacent said window for viewing along with said filter member for comparison therewith such that when the color of the filter member matches the color indicator, said filter member can be replaced.

32. The filter assembly defined in claim 23 wherein said filter member is a HEPA filter.

33. A filter assembly for use with an oxygen concentrator comprising:
    a housing member having an inlet opening and an outlet opening;
    a first chamber positioned and located within said housing member in fluid communication with said inlet opening for receiving ambient air therewithin;
    a filter member disposed within the interior of said first chamber;
    a pair of noise attenuating members positioned within said first chamber in spaced apart relationship adjacent at least a portion of one side of said filter member to minimize noise from the ambient air flowing through said first chamber, said pair of noise attenuating members forming a channel therebetween, said channel being in fluid communication with said inlet opening;
    a second chamber positioned and located within said housing member adjacent another side of said filter member such that ambient air passing through said filter member will enter said second chamber, said second chamber including said outlet opening; and
    another noise attenuating member positioned and located in front of said outlet opening to minimize noise from the ambient air exiting said housing member;
    said first and second chambers, said filter member and said noise attenuating members being disposed within said housing member such that ambient air entering said inlet opening will migrate along said channel and through said pair of noise attenuating members anchor said filter member into said second chamber, and through said second chamber and said another noise attenuating member into said outlet opening;
    the configuration of said first and second chambers, along with the positioning and location of said filter member and said noise attenuating members therewithin providing noise attenuation for ambient air flowing through the filter assembly.

34. The filter assembly defined in claim 33 wherein said noise attenuating members are made of a foam material.

35. The filter assembly defined in claim 33 wherein said housing member includes retaining means positioned within said first chamber for holding said pair of noise attenuating members in spaced apart relationship adjacent one side of said fitter member.

36. The filter assembly defined in claim 33 wherein said housing member includes support means in said second chamber for holding said another noise attenuating member in front of said outlet opening.

37. The filter assembly defined in claim 33 wherein said another noise attenuating member positioned and located in front of said outlet opening extends along the entire length of the wall portion associated with said outlet opening in said second chamber.

38. The filter assembly defined in claim 33 wherein said housing member includes a tubular extension in communication with said outlet opening adaptable for engaging a corresponding compressor fitting associated with an oxygen concentrator.

39. The filter assembly defined in claim 33 wherein the entry edges of said inlet opening are rounded to further facilitate noise attenuation.

40. The filter assembly defined in claim 36 wherein said housing member further includes at least one additional member associated with said second chamber for abutting said another noise attenuating member when said another noise attenuating member is held in proper position in front of said outlet opening by said support means.

41. The filter assembly defined in claim 33 wherein said housing member includes a sight glass positioned above a portion of said filter member at the opposite end of said first chamber from said inlet opening for viewing the cleanliness of said filter member.

* * * * *

UNITED STATES PATENT AND TRADEMARK OFFICE
CERTIFICATE OF CORRECTION

PATENT NO. : 7,141,101 B2  Page 1 of 1
APPLICATION NO. : 10/710087
DATED : November 28, 2006
INVENTOR(S) : Harold P. Amann It is certified that error appears in the above-identified patent and that said Letters Patent is hereby corrected as shown below:

Col. 4, line 1, delete "recogized" and replace with -- recognized --

Col. 10, line 65, delete "type"

Col. 12, line 55, delete "anchor" and replace with -- and/or --

Col. 13, line 3, delete "fitter" and replaced with -- filter --

Signed and Sealed this

Ninth Day of January, 2007

JON W. DUDAS
*Director of the United States Patent and Trademark Office*